United States Patent Office 2,795,137
Patented June 11, 1957

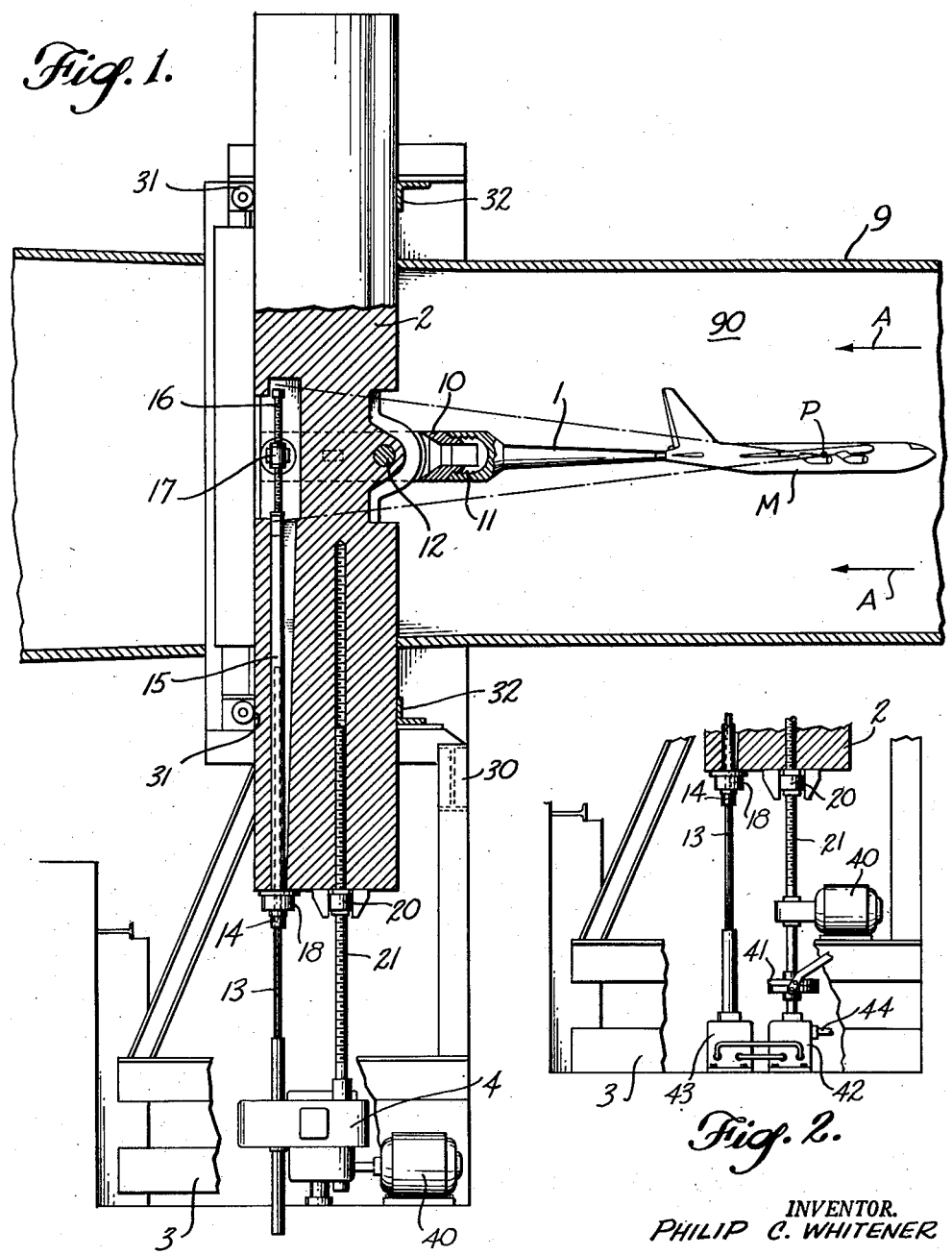

2,795,137
WIND TUNNEL MODEL SUPPORTS

Philip C. Whitener, Seattle, Wash., assignor to Boeing Airplane Company, Seattle, Wash., a corporation of Delaware Application September 16, 1954, Serial No. 456,576

7 Claims. (Cl. 73—147)

In wind tunnel operations it is necessary to dispose the model being tested at a known angle to the air flow through the tunnel. It may be necessary to compare observations at some given angle to similar observations at a different angle. The adjustment of the model is about some center, possibly the center of pressure of the sustaining surfaces or the center of gravity of the airplane as a whole, but generally speaking, about a selected center in the vicinity of a median point with relation to the fore and aft and transverse extent of the airplane model. To do so it is, of course, necessary to ascertain with precision the direction of air flow at such a point, which can be done by the mechanism disclosed in the companion application of Gordon H. Cheney, entitled Flow Angle Probe for Wind Tunnels, Serial No. 444,059, filed July 19, 1954. Having determined the direction of air flow, it is necessary that the model be supported with relation to the same point, and for adjustment about the point, concerning which the determination of air flow direction was made. The present invention is concerned with the model support for accomplishing such support and adjustment of the model, being at the same time a support which is capable of preliminarily supporting the flow angle probe of the Cheney invention.

Since the point about which adjustment is to be accomplished must be a point in free space, and not a point adjacent any flow-interrupting or modifying structure, it is clear that the model support, though mounted upon and supported by such a structure, for adjustment, must be actually adjustable with relation to this point in space, ahead of that structure.

The model support, according to the present invention, takes the form of an elongated, somewhat streamlined arm or stinger, projecting in the general direction of air flow, and according to the present invention, this arm is mounted upon a columnar support which extends transversely of the wind tunnel, in such a way as to effect adjustment of the arm about a point in the vicinity of its forward end as an approximate center. It is intended to make clear by the above that the point about which adjustment is accomplished is located in alignment with and in the general vicinity of the forward end of the supporting arm, yet whether precisely at the forward tip, or behind that tip within the confines of the arm's structure, or, as it usually is, located somewhat ahead of the tip of this supporting arm, is not material.

A wind tunnel model support, especially when it is required to support scale models constructed to reasonably large scale and subject to considerable stresses such as they would be when subjected to air flow in the sonic range, and when the model is supported at an appreciable moment arm from the support, is subject to extremely large forces. It is, therefore, essential that the support as a whole, including its adjustments, be arranged in a manner to avoid the multiplication and augmentation of stresses on individual parts. The main support must be of extremely large size and mass, and at best will be subject to large forces, and thus will be difficult of adjustment, whereas if the same is subject to augmented forces, its adjustment and the adjustment of related parts will be correspondingly more difficult. It is an object of this invention to provide a wind tunnel model support which despite the large size and mass of certain components such as this main support will nevertheless be readily adjustable with a minimum of force consonant with the size and mass of such parts.

Additional objects will be more clearly understood as this description progresses, and from a study of the accompanying drawing, wherein the invention is shown diagrammatically in typical forms, and of this specification together with the claims at the end thereof.

Figure 1 represents diagrammatically a general, sectional view along a vertical plane axially of the throat of a wind tunnel, illustrating the present invention employed in the support of a model being tested.

Figure 2 is a detail elevational view of a transmission element which may be substituted for that which is, in Figure 1, employed between the two shafts or jack screws which are part of the operative mechanism.

The wind tunnel is indicated at 9, and the air flow is moving its throat 90 in the general direction indicated by the arrows A. A model M is shown supported in a definite relation to a point P, which will be referred to hereinafter. This model is supported upon a stinger or forwardly projecting, generally horizontal arm 1, removably mountable upon a base 10, as by means of the screw threads indicated at 11, so that the model is rigid with the arm. The base 10, and consequently the arm 1, are pivotally mounted at 12 for tilting about a transversely directed pivot axis, being pivotally supported to that end upon a main columnar support 2. This columnar support is of large size and mass, being sometimes of a mass in the vicinity of five tons, yet it must be adjusted in the direction of its length with precision and by small amounts. It is guided at 31 and 32 in a fixed guide structure 30, rising above a fixed base 3 of any suitable formation. Normally this base would be fixed with relation to the earth which supports the wind tunnel proper. Adjustment of the columnar support 2 is accomplished by means such as the jack screw 21, threadedly engaged with the columnar support or with a nut 20 which constitutes in effect a part of that main support. The jack screw 21 reacts from the fixed base 3, and its support and drive connection will be further described hereinafter.

Since it is evident that adjustment or displacement bodily of the columnar support 2 in the vertical direction will displace the pivot axis at 12 of the arm 1, the position of that arm must be further controlled by means which are adjustable in consonance with the adjustment of the main support 2. To this end, a drive shaft 13 is arranged through a splined connection at 14 to drive a shaft extension 15 which is journaled within the columnar support 2 in general parallelism with the jack screw 21. The upper end of the shaft 15 drives a second jack screw 16 threadedly engaged within a nut 17 which is secured to the arm 1 or to its base 10, at a distance from the pivot axis at 12. The connection at 17 might be ahead of or behind the tilting axis at 12, although preferably behind the same.

The splined connection at 14, coupled with the use of a thrust bearing 18 between shaft 15 and the columnar support 2, relieves the shaft 13 of any appreciable thrust loading, leaving the shaft 13 to assume only the load required to alter the angularity of the arm 1 about the point P, which point is in the vicinity of the forward end of the arm 1, within the limits expressed hereinabove. It will be evident that if the jack screw 21 and the jack screw 16 are rotated alike and at the same axial rate, the nut at 17 and the pivot axis at 12 may be raised or lowered together, and if this were accomplished, the point P would also be raised or lowered at the same rate and the arm 1 would be traversed without effecting its tilting about the pivot axis at 12. On the other hand, if there is a differential of feed rate as between the jack screws 21 and 16, any such differential will accomplish a tilting of the arm 1 and of the model M about the pivot axis at 12. If the effective rate of the advance of the jack screw 16 is somewhat greater than the effective rate of advance of the jack screw 21, the arm 1 will tilt about a point located forwardly of the pivot axis 12, and this rate can be and is desirably so adjusted, and continuously augmented, that the arm is, in effect tilted about the selected point P in the vicinity of the forward end of the arm. The net result is that the model M is tilted in its angle with relation to the air flow A through the throat 90, without being displaced with relation to the walls of the tunnel.

Two means to accomplish the end above are provided, the one in Figure 1 and the other in Figure 2. In Figure 1 a motor 40 is connected through a gear box 4 to the jack screw 21 to cause the columnar support 2 to be displaced in the direction of its length, to traverse the pivot point 12 across the throat of the wind tunnel. Within the gear housing 4 are suitable gear trains, and any known design of variable differential gearing may be employed, by which to drive the shaft 13. By choice of a desired gear ratio, the effective rate of advance of the jack screw 16 may be equal to or at a rate so much different from the effective rate of advance of the jack screw 21 as will cause tilting of the arm 1 about the pivot axis at 12 by a given amount. Since, if the tilting of the arm 1 is to occur about the approximate center at the point P, it is necessary to change the ratio between the effective advance of the jack screw 16 and the jack screw 21 from time to time, that is, as the tilting of the arm 1 progresses, it is for this reason that the several variable differential gears referred to above are employed. Also, since it may be desired at times to move the columnar support 2 independently of any movement of the nut at 17, in that way to accomplish tilting of the arm 1 about its pivot axis at 12, disengageable clutch means (not separately shown) may be provided between the motor 40 and the shaft 13.

In Figure 2 the motor 40 is shown as directly connected to the shaft 21 and as connected through a clutch mechanism, illustrated diagrammatically at 41, to a pump unit 42 of a Waterbury hydraulic transmission gear. The pump unit 42 is connected to the motor unit 43 of the Waterbury gear, and the latter is connected to drive the shaft 13. Adjustment of the rate of drive of the motor unit 43 by the pump unit 42 is accomplished by the control, diagrammatically indicated at 44. By a means such as this, adjustment at infinitely variable rates as between the effective rates of feed of the jack screws 16 and 21 may be accomplished.

I claim as my invention:

1. In combination with the throat of a wind tunnel, an elongated columnar support extending vertically across the throat, and guided for movement in the direction of its length, a model-supporting arm projecting forwardly from the support within the throat, means mounting said arm upon said support for bodily movement with the support, and also for tilting movement relative to the support about a pivot axis transverse to the support and to the direction of air flow, drive means, and an operative connection from said drive means to the support and also to the arm at a point outwardly from its pivot axis, said drive connection including means to vary by selected ratios the rate of movement in the direction of the column's length of said point on the arm and of the support itself, respectively, to govern the amount and direction of tilting of the arm during shifting of the support.

2. The combination of claim 1, including means for disconnecting the operative connection between the drive means and the arm, for bodily movement of the columnar support.

3. In combination with the throat of a wind tunnel, an elongated columnar support extending vertically across the throat, fixed guide means guiding said support for vertical movement, column-shifting means reacting between said guide means and the support for shifting the columnar support bodily vertically, a model-supporting arm projecting forwardly from the support within the throat, pivot means mounting said arm upon said support for tilting about a generally transverse, horizontal pivot axis, arm-tilting means reacting between said support and the arm at a point outwardly from its pivot axis, and means operatively connecting the column-shifting means and the arm-tilting means for conjointly operating the two at selected relative rates of advance, to control the amount and direction of tilting of the arm during shifting of the columnar support.

4. In combination with the throat of a wind tunnel, an elongated columnar support extending transversely of the throat and guided for movement in the direction of its length, a model-supporting arm projecting forwardly from said support within the throat, generally in the direction of air flow, pivot means mounting said arm upon said support for tilting about an axis transverse to the direction of air flow, means operatively connected to said arm radially outwardly from its tilting axis, for tilting said arm, means operatively connected to the support for shifting the same bodily in the direction of its length, thus to shift the location of the arm's pivot axis, and means operatively connecting the arm-tilting means and the support-shifting means for conjointly operating the two at selected relative rates of advance.

5. A wind tunnel model support comprising an elongated arm projecting forwardly in the general direction of air flow, and formed at its forward end for support of a model thereupon, a main support guided for movement bodily transversely of the direction of air flow, means supporting said arm from said main support for tilting about a pivot axis disposed transversely to the air flow and to the main support's direction of movement, two displacing means reacting along lines generally parallel to the direction of movement of the main support, one thereof being operatively connected to the main support to effect its bodily movement, and the other being operatively connected to the arm, at a given radial distance from its pivot axis, to govern the arm's tilting about such pivot axis, and drive means operatively connected to the two displacing means to drive the two at selected relative rates, to effect tilting of the arm about an approximate center located in the vicinity of its forward end.

6. A wind tunnel model support as in claim 5, wherein the main support is movable vertically.

7. A wind tunnel model support comprising an elongated arm projecting forwardly in the general direction of air flow, and formed at its forward end for support of a model thereupon, a fixed base, a main columnar support directed vertically transversely of the air flow, means guiding said main support for adjusting movement in the vertical direction, a first jack screw reacting from said base and threadedly engaged with the main support to effect such adjustment, pivot means supporting said arm from the columnar support for tilting about a pivot axis disposed transversely of the air flow and of the direction of the support's movement, a second jack screw journaled in said main support, generally parallel to the first jack screw, but in a line offset from the arm's pivot axis, a nut carried by said arm and threadedly engaged with said second jack screw, whereby to effect tilting of the arm about its pivot axis by reaction from the main support, a drive shaft having a slidable splined connection to the second jack screw, drive means on the fixed base, and transmission means operatively connecting said drive means with said first jack screw and with said drive shaft, respectively, said transmission means including means to vary the drive ratio between the two jack screws by selected amounts.

References Cited in the file of this patent

UNITED STATES PATENTS

| | | |
|---|---|---|
| 1,498,023 | Fales | June 17, 1924 |
| 2,612,776 | Klas | Oct. 7, 1952 |
| 2,700,305 | Kendall | Jan. 25, 1955 |